Jan. 7, 1964 R. FAVRE 3,117,265
ELECTROMAGNETIC SYSTEM FOR THE MAINTENANCE
OF THE MOVEMENT OF A MOVABLE MEMBER
Filed July 8, 1960 7 Sheets-Sheet 1

Jan. 7, 1964

R. FAVRE 3,117,265

ELECTROMAGNETIC SYSTEM FOR THE MAINTENANCE
OF THE MOVEMENT OF A MOVABLE MEMBER

Filed July 8, 1960

Jan. 7, 1964 R. FAVRE 3,117,265
ELECTROMAGNETIC SYSTEM FOR THE MAINTENANCE
OF THE MOVEMENT OF A MOVABLE MEMBER
Filed July 8, 1960 7 Sheets-Sheet 3
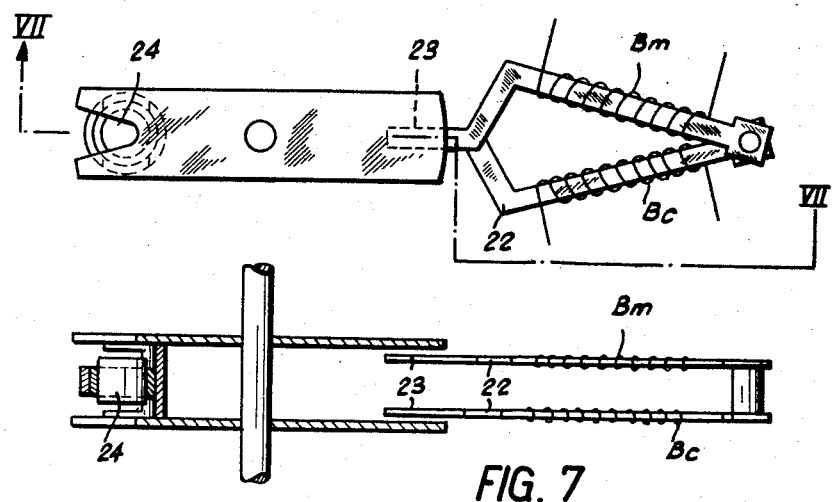
*FIG. 6*
*FIG. 7*
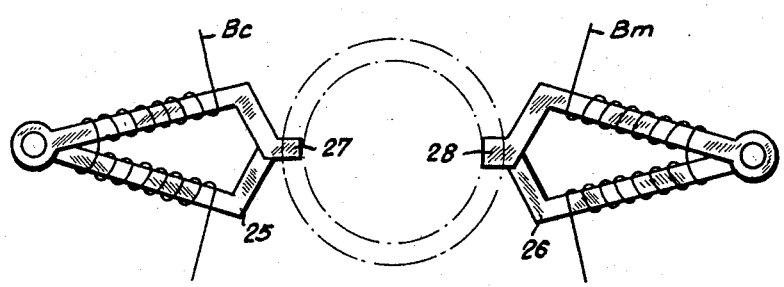
*FIG. 8*

FIG. 9 FIG. 10 FIG. 11
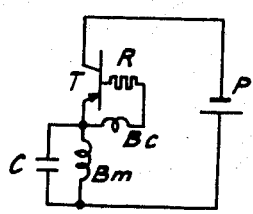
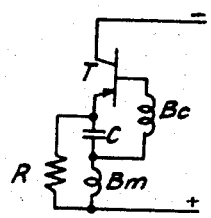
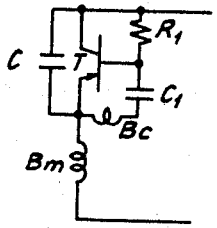
FIG. 37 FIG. 12 FIG. 39
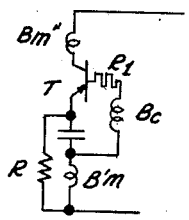
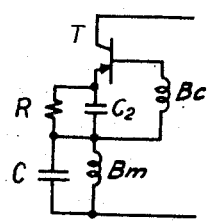
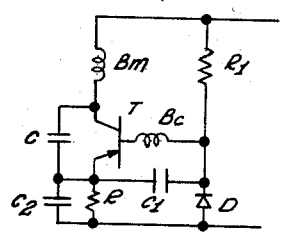
FIG. 38 FIG. 13 FIG. 40
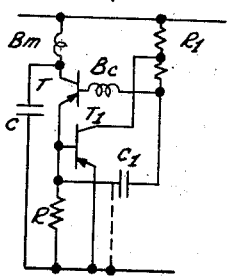
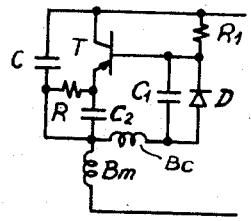
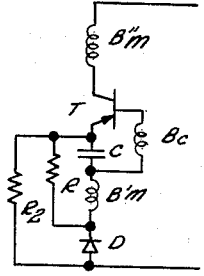

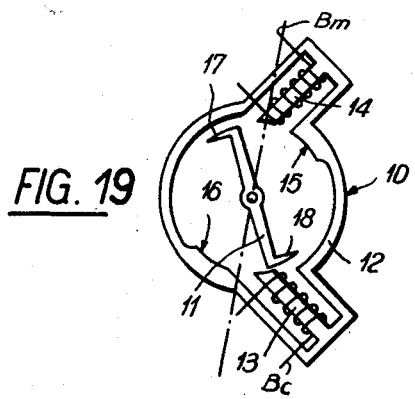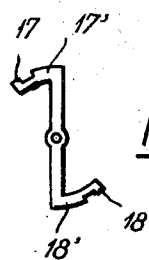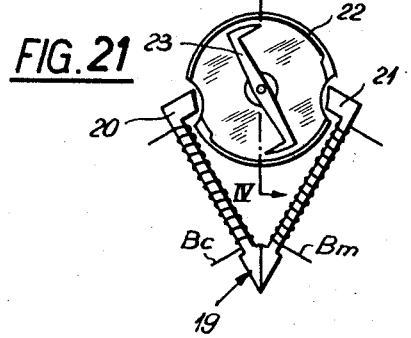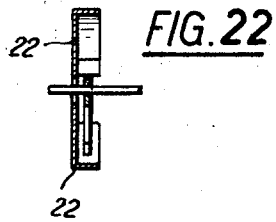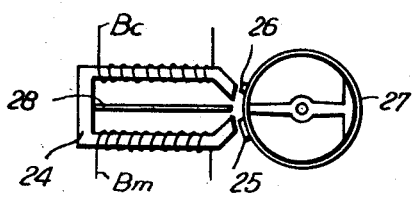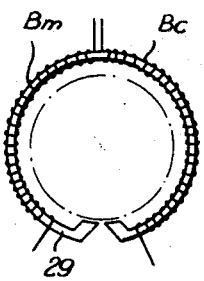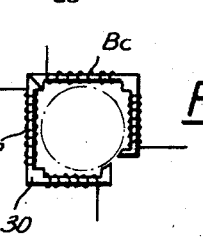

Jan. 7, 1964   R. FAVRE   3,117,265
ELECTROMAGNETIC SYSTEM FOR THE MAINTENANCE
OF THE MOVEMENT OF A MOVABLE MEMBER
Filed July 8, 1960   7 Sheets-Sheet 7
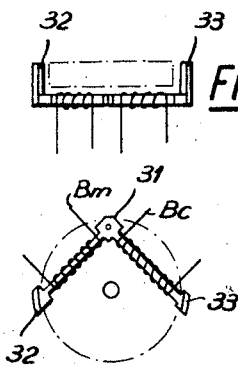
FIG.26
FIG.27
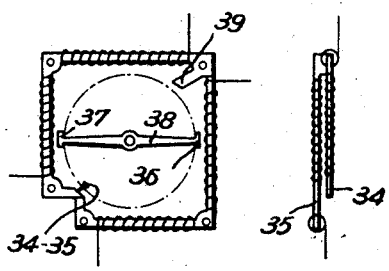
FIG.28   FIG.29
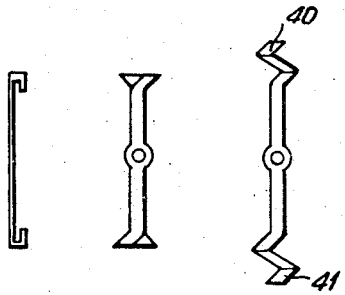
FIG.32   FIG.31   FIG.30
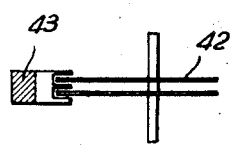
FIG.33   FIG.34
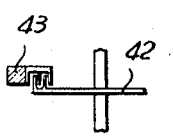
FIG.35
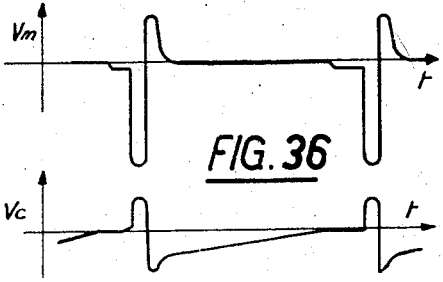
FIG.36

United States Patent Office 3,117,265
Patented Jan. 7, 1964

3,117,265
ELECTROMAGNETIC SYSTEM FOR THE MAINTENANCE OF THE MOVEMENT OF A MOVABLE MEMBER
Robert Favre, Lausanne, Switzerland, assignor to Fabriques Movado, La Chaux-de-Fonds, Switzerland, a firm of Switzerland
Filed July 8, 1960, Ser. No. 41,507
Claims priority, application Switzerland July 11, 1959
12 Claims. (Cl. 318—132)

The present invention has for its object an electromagnetic system for the maintenance of the movement of a movable member such as the balance wheel of a time keeper. This system includes at least one magnetic circuit constituted by a stationary section and a section rigid with the member of which it is desired to produce a permanent movement, said circuit comprising a permanently magnetized member, a member of magnetizable material showing no remanence and subjected transiently to a fraction of the magnetic flux passing out of the magnetized member and a magnetic screen through which said flux closes when it is not collected by the non-remanent magnetic member, while at last one electric circuit is provided, which includes a supply of current, a collecting winding, a driving winding and an amplifier. The magnetic and electric circuits are arranged in such a manner that the shunting of the flux into the non-remanent magnetic member may induce a voltage in the collecting winding, which produces a pulse in the driving winding, serving for the desired maintenance of movement.

According to the present invention, the three elements forming the magnetic circuit, to wit: the permanently magnetized member, the member of magnetizable material and the screen, are shaped in such a manner that the screen shunts only a negligible fraction of the flux during the time intervals in which the magnetizable member is magnetized, in such a manner that the transient periods at the beginning and at the end of said time intervals may be extremely short.

The accompanying drawings illustrate, by way of example, several embodiments of the invention, said embodiments forming systems for the maintenance of the movement of a spiral spring balance wheel. In said drawings:

FIG. 6 is a plan view of a third embodiment, FIG. 7 being a sectional view through line VII—VII of FIG. 6.

FIG. 8 is a plan view of a fourth embodiment.

FIGS. 9 to 18 show various wiring diagrams applicable to the different embodiments illustrated in FIGS. 1 to 8.

FIG. 19 is a diagrammatic plan view of a fifth embodiment and FIG. 20 shows a modification of the rotor of FIG. 19.

FIG. 21 is a diagrammatic plan view of a sixth embodiment.

FIG. 22 is a cross-section through line XXII—XXII of FIG. 21.

FIG. 23 is a diagrammatic plan view of a seventh embodiment.

FIGS. 24 and 25 show two modifications of the stator of said seventh embodiment.

FIGS. 26 and 27 are an elevational and a plan view of the stator of an eighth embodiment.

FIGS. 28 and 29 are a plan view and a side view of a ninth embodiment.

FIGS. 30 to 32 illustrate a method for producing the rotor of said ninth embodiment.

FIGS. 33 to 35 illustrate arrangements which improves the magnetic coupling between the stationary and rocking sections of the magnetic circuit.

FIG. 36 shows curves corresponding to the modifications in voltage across the terminals of the collecting and driving windings during the oscillations of the balance wheel.

FIGS. 37 to 40 illustrate a number of electric circuits applicable to the embodiments illustrated in FIGS. 19 to 35.

Figure 1:
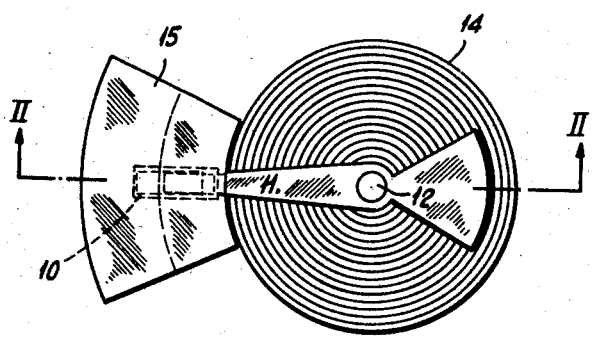
FIG. 1 is a plan view of a first embodiment, FIG. 2 being a sectional view through line II—II of FIG. 1 and FIG. 3 being an elevational front view of the screen and of the magnet.
Figure 2:
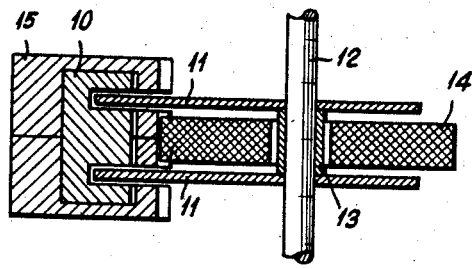
Figure 3:
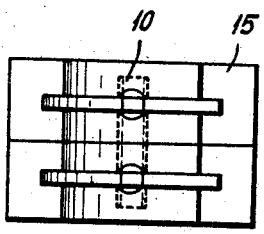

Turning to the first embodiment illustrated in FIGS. 1 to 3, the latter shows a magnetic circuit including, on the one hand, a stationary permanent magnet 10 and, on the other hand, two superposed blades 11 made of a magnetizable material showing no remanence, keyed to the balance staff 12 and interconnected magnetically through a sleeve 13 surrounding said staff.

Said circuit is associated with a stationary winding 14 arranged coaxially with the sleeve 13 between the superposed blades 11. Said winding 14 includes an elementary generating winding Bc and a driving winding Bm inserted respectively in the input and output circuits of an amplifier.

The magnet 10 is in the shape of the letter E forming gaps engageable by the blades 11 and its magnetization is such that the surfaces of the gaps facing one of the blades 11 are of the same polarity, the polarities being opposed for the gap surfaces facing different blades. The magnet 10 is fitted inside a screen 15 of a magnetizable material showing no remanence and having a high magnetic permeability, said screen being in the shape of an annular sector coaxial with the staff 12. Said screen is transversely slotted in registry with the gaps formed in the magnet, so as to allow the engagement with the latter of the ends of the blades during the oscillations of the balance carrying the latter.

The movement of the balance is maintained by pulses transmitted periodically to the blades 11 in the following manner: during the oscillatory movement of the balance, the flux produced by the magnet 10 closes either through the screen 15, or else, partly through the latter and partly through the blades 11, according as to whether the ends of the latter lie outside or inside the magnet. The blades form therefore, when they enter and pass out of the magnet 10, the seats of modifications in flux, which modifications generate, inside the winding Bc signals of opposite signs. The amplifier is designed in such a manner as to amplify only the signals corresponding to outward movement, the pulses passing through the winding Bm having a direction corresponding to a repulsion between the magnet and the blades.

It should be remarked that over said electromagnetic maintenance pulse, there is superposed a second pulse of a purely magnetic character due to the transient magnetization of the blades entering the magnet.

Under such conditions, the balance is subjected at each alternation of its movement to maintenance pulses, respectively before and after its passage through its position of static equilibrium.

In practice, it will be endeavoured to time said pulses so that they appear in the immediate vicinity of the passage of the balance through said positions of static equilibrium with a reduction to the utmost of the duration of the transient periods. From this standpoint, the structure illustrated in FIGS. 1 to 3 is particularly favorable.

In order to cut out the residual magnetization which might remain in the blades after they have passed out of the magnet and which might oppose their movement out of the screen it may be of interest to insert in the electric circuit a condenser which is discharged into the driving winding after the passage of the maintenance pulse, said discharge being performed in a direction opposed to that of said pulse. The condenser may be charged, either through induction or through a supply of current and, obviously, the data defining said circuit should be selected in a manner such that the discharge of the condenser produces no electric oscillation.

Electric circuits incorporating condensers charged in either of said manners are illustrated in FIGS. 9 to 18 described hereinafter.

According to a modification of the first embodiment, the blades cooperate with two magnets which are diametrically opposed with reference to the balance staff. In this case, the maximum allowable amplitude of the oscillations of the balance is reduced by one-half.

Figure 4:
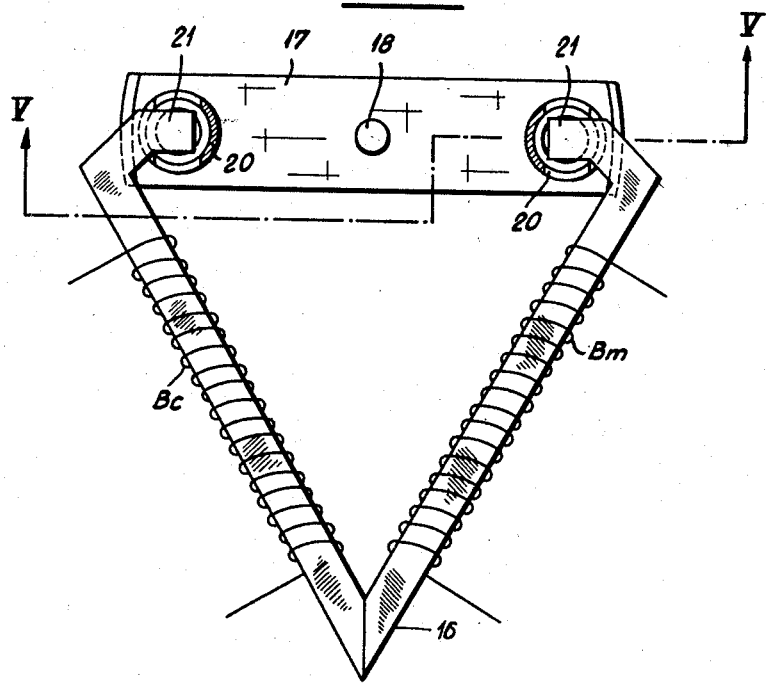
FIG. 4 is a plan view of a second embodiment wherein the rocking section of the magnetic circuit is shown cross-sectionally through line IV—IV of FIG. 5.
Figure 5:
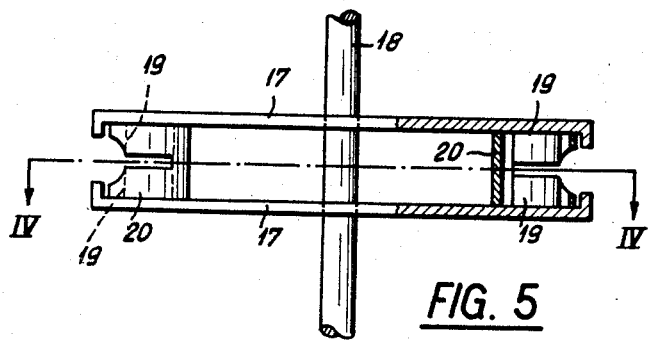
FIG. 5 is a cross-section through line V—V of FIG. 4 without the stationary section of the magnetic circuit.

In the second embodiment illustrated in FIGS. 4 and 5, the stationary section of the magnetic circuit is constituted by a V-shaped part 16 made of non-remanent magnetizable material and over the arms of which are wound respectively the windings $Bc$ and $Bm$. The oscillating section of the circuit includes two plates 17 keyed to the spindle 18 of the balance and carrying two pairs of permanent magnets 19 in diametrically opposed relationship between the outer ends of said plates, while two slotted tubes surround coaxially each pair of permanent magnets. The magnets of each pair are spaced apart, so as to form a gap between them. Said magnets are such that the surfaces bounding each gap are of similar polarity, the polarities being opposed for the two gaps. Said gaps are periodically engaged during the oscillations of the balance by the heads 21 of the arms of the V-shaped magnetizable member 16.

The plates 17 and the screen tubes 20 are made of a material having a high magnetic permeability without any remanence, so as to form a screen for the magnets 19.

Under such conditions, the flux produced by the magnets closes through the magnetizable member 16 when the oscillating section of the magnetic circuit is in its position of static equilibrium illustrated in FIG. 4, and through the screen during the periods during which the heads 21 lie outside the gaps.

The operation of said second embodiment is exactly the same as that of the embodiment illustrated in FIGS. 1 to 3.

In the third embodiment illustrated in FIGS. 6 and 7, the stationary section of the magnetic circuit is constituted by a member 22 including two arms 23 arranged in superposition and over which are wound the windings $Bc$ and $Bm$ respectively. The section of the magnetic circuit rigid with the balance wheel is of the same type as that illustrated in FIGS. 4 and 5, but it includes only one magnet 24, the ends of which have different polarities.

As in the preceding embodiments, the magnetic flux produced by the magnet 24 is closed alternatingly over the magnetizable member 22 and over the screen exclusively.

The operation is the same as above described and the amplitude of the oscillation of the balance wheel may reach about 300°.

Said amplitude is reduced by one-half in the fourth embodiment illustrated in FIG. 8, which includes two separate magnetic circuits, of which the stationary sections 25 and 26 carry respectively the windings $Bc$ and $Bm$, while the oscillating sections which is diametrically opposed, are constituted by two magnets, of the type illustrated in FIG. 7.

In this last embodiment, the breadths of the heads 27 and 28 of the stationary section are different, so that for one direction of rotation of the balance, the pulses passing through the winding $Bm$ do not produce any driving pulse.

FIGS. 9 to 18 show a number of electric circuits including transistors applicable for association with the different structures described. These circuits and their possible modifications are characterized by the relative position between the windings and the electrodes of the transistor. Thus, in the different examples described, the driving winding may be connected either with the collector or with the emitter of the transistor, while the generating winding which is generally inserted in the base circuit, may also be inserted in the emitter circuit when the driving winding is inserted in the collector circuit. Lastly, when the driving winding is inserted in the emitter circuit, the generating winding, which is generally inserted between the emitter and the base, may, as well, be inserted between the base and ground which implies a higher input voltage.

The circuit illustrated in FIG. 9 includes a voltaic cell P, a transistor T, the windings $Bc$ and $Bm$, a thermistor R and a condenser C in parallel with the driving winding $Bm$. Said condenser C is charged by the induction current generated at the end of the driving pulse and it is discharged, after the passage of said impulse, in a direction opposed to the latter in to the driving winding, whereby a demagnetizing field is produced in the section of the magnetic circuit showing no remanence.

In the circuit illustrated in FIG. 10 including the same parts as FIG. 9, the condenser C is charged by the voltaic cell P during the driving pulse. The condenser then discharges through the winding $Bm$ and the resistance R with the same results are those obtained by the condenser in the circuit illustrated in FIG. 9, after the passage of the driving pulse. The resistance R cooperates on the other hand, in compensating the thermic shifting in the transistor arising through modifications in temperature. Said resistance provides a time constant RC which allows locking the transistor after each driving impulse for a predetermined duration.

This locking of the transistor is also obtained in the circuit illustrated in FIG. 11, in accordance with the same principle as the circuit of FIG. 9 by means of a further condenser C1.

A suitable selection of the values defining the duration of locking of the transistor allows transmitting to the balance a maintenance pulse only for every other alternation i.e. all the pulses are in the same direction.

In the circuit illustrated in FIG. 12 showing the elements of the circuits of FIGS. 9 and 10, there is provided a further condenser C2 which uncouples the resistance R and introduces a time constant RC2.

The circuit illustrated in FIG. 13 is an improvement of the circuit illustrated in FIG. 12, in so far that the thermic shifting is compensated in an improved manner. Said circuit includes a diode $d$ preferably of the silicon type, producing a D.C. current only for voltages at least equal to 0.3 volt, which provides a biasing voltage for the base of the transistor with reference to ground. The emitter is subjected to said biasing of the base by reason of the presence of the condenser C2 which allows a well-defined current to flow for inoperative conditions through the resistance R. The condenser C2 ensures the dynamic coupling between the winding $Bm$ and the base of the transistor. The resistance R1 produces a biasing of the current feeding the base of the transistor. For certain types of transistors, the resistance R1 should be shunted across the diode. In said circuit, there are two time constants which govern the locking of the transistor, as shown at R1—C1 and RC2.

Figure 14:
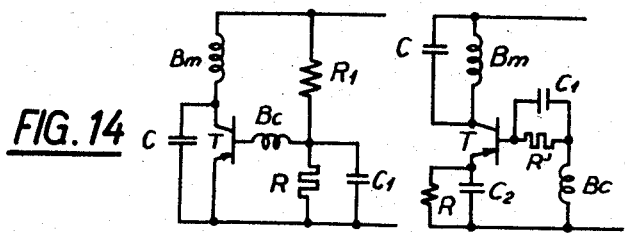
Figure 15:
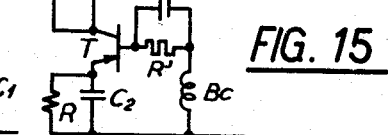

The circuit of FIG. 14 is a modification of that illustrated in FIG. 11, wherein a thermistor R is introduced for the compensation of thermic shifting. The circuit of FIG. 15 is a modification of that illustrated in FIG. 14 and shows an improved compensation of the thermic shifting, as provided by an emitter resistance R uncoupled by condenser C2.

Figure 16:
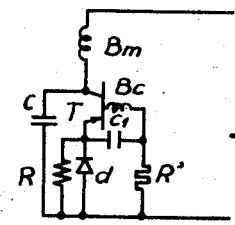

In the circuit illustrated in FIG. 16, the thermic modifications are compensated by an emitter resistance R uncoupled by a diode *d* of the silicon type, which becomes suddenly conductive for 0.3 volt. The voltage of the emitter, when inoperative, should therefore be selected as equal to about 0.2 volt, so that the compensation of the thermic shifting may be obtained for the non-conductive range of the diode which acts only at the moment of a driving pulse. A thermistor R' for biasing the base provides for complete compensation.

Figure 17:
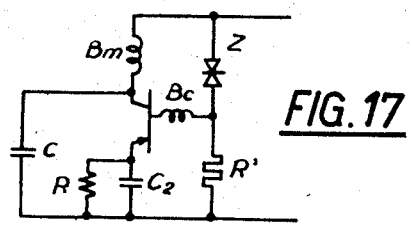

In the diagram illustrated in FIG. 17, the biasing of the transistor base is ensured by a thermistor R' and a Zener diode Z, the operative voltage of which is lower by a few tenths of a volt than that of the voltaic cell, so as to provide a sufficient range of compensation of thermic shifting. In the case of transistors of the silicon type, in particular, the diode should be shunted by a resistance and the thermistor R' should be cut out.

Figure 18:
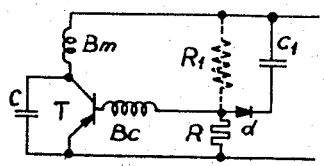

Lastly, FIG. 18 is a modification of FIGS. 11 and 14 incorporating furthermore a diode *d* adapted to prevent any parasitic oscillation from arising as a consequence of the coupling between the windings B*m* and B*c*.

The fifth embodiment illustrated in FIG. 19 includes a magnetic circuit made of magnetizable material without any remanence and formed by a stationary section 10 and a movable section or rotor 11, keyed to the staff of the spiral spring balance.

The section 10 includes a cylindrical screen 12 and two cores 13 and 14 over which are wound respectively a generating winding B*c* and a driving winding B*m*.

The screen 12 is provided with two heads located in the vicinity of the cores 14 and 15. The rotor is in the shape of a bar the ends of which are bent in opposite directions at right angles to form two blades 17 and 18.

The windings B*c* and B*m* are inserted in the input and output circuits of an amplifier, of the type illustrated in FIGS. 37 to 40 to be described hereinafter. Said circuits are designed in a manner such that a current of a low intensity may flow through the winding B*m* in a manner such as will magnetize the core 14. The flux produced by said core closes through the head 15 when the rotor is shifted away from its position of static equilibrium corresponding to the axis drawn in dot and dash lines in FIG. 19, and it closes through the rotor 11 the core 13, and the screen 12 when the balance passes through said position of static equilibrium.

The shunting of the flux through the core 13 at the moment at which the balance passes through its position of static equilibrium produces in the winding B*c* a signal controlling the passage of a current pulse through the winding B*m*. This produces a magnetization of the core 14 and of the rotor 11 which is thus subjected to a maintenance pulse.

The cores 13 and 14 and the heads 15 and 16 formed on the stationary section 10 are not arranged in diametrically opposite relationship so that when the rotor registers with the cores during movement in anticlockwise direction, the flux produced closes through the rotor in the manner described whereas in the other direction of rotation, said flux is short circuited by the blade 17 and the head 15. Under such conditions, the signal collected by the winding B*c* is too weak for it to produce a current in the winding B*m* and the balance is thus subjected only to the maintenance pulses produced in a single direction.

It is also possible to obtain this result by resorting to an electric circuit including elements which delay the moment at which the magnetizing current appears by a lag ranging between one half and a complete oscillatory period.

The duration of the maintenance pulses depends on the characteristic features of the electric circuit and on the angular speed of the rotor. When said speed is low, the data of the electronic circuit limit the duration of the maintenance pulse. On the contrary, if the angular speed is large, the pulse is limited by the position of the rotor which produces a further increase in the reluctance of the magnetic circuit so that the duration of the pulse is then shortened whereby the arrangement acts as a speed stabilizer.

FIG. 20 illustrated a modification of the rotor of FIG. 19 which is sufficient to ensure alone but with a lesser efficiency the rotation in the direction corresponding to the driving pulses. The blades of the rotor of FIG. 20 include each two parts 17—17' and 18—18'. When the direction of rotation is such that the inner part 17'—18' produces the pulses, the latter forms normally the driving pulses which is not the case when the pulse is released by the outer parts 17—18 by reason of the very reduced length of said parts of the blades.

In the sixth embodiment illustrated in FIGS. 21 and 22, the stationary section of the magnetic circuit is constituted by a V-shaped member 19 arranged on the outside of the rotor. The ends 20 and 21 of the arms of said members are bent to form heads adapted to enter the notches of a circular screen 22 inside which the rotor 23 oscillates which is of the same type as that illustrated in FIG. 19. The operation of said embodiment is altogether similar to that of the embodiment illustrated in said FIG. 19.

In the seventh embodiment illustrated in FIG. 23, the stationary section of the magnetic circuit is constituted by a U-shaped member 24 the arms of which carry the corresponding windings B*c* and B*m*. The oscillatory section of the magnetic circuit is formed by two heads 25 and 26 of different arcuated lengths rigid with a balanced annulus keyed to the balance staff.

The head 25 has a size such that it closes the magnetic circuit when it registers with the ends of the arms of the member 24, the head 26 is of a reduced size and is adapted to define the desired direction of rotation under the action of driving pulses in a manner similar to that described with reference to the heads 15 and 16 in the case of FIG. 19. Under such conditions, the balance is subjected to a maintenance pulse each time the head 25 registers with the U-shaped member 24 before the head 26 i.e. at each alternation corresponding to an anticlockwise rotation of the balance. For the other alternations, the pulses produced by the head 26 does not provide any drive by reason of the reduced size of said head 26. As a matter of fact, the time constant locking the circuit prevents said non driving pulses from arising.

It is also possible to separate in said structure the arms of the U-shaped member 24 by a plate 28 with a view of reducing the coupling between the two windings.

FIGS. 24 and 25 illustrate modification of said seventh embodiment wherein the stationary sections of the magnetic circuits assume respectively the shape of a circle 29 and of a square frame 30 surrounding in both cases the rotor.

FIGS. 26 and 27 illustrate an eighth embodiment wherein the stationary section 31 is in the shape of an inverted V the two arms of which terminate with upstanding lugs 32 and 33 between which the rotor oscillates. The embodiment illustrated in FIGS. 28 and 29 distinguishes from the preceding embodiment through the fact that the terminal surfaces 34 and 35 registering with the rotor 38 when the latter passes through its position of static equilibrium are arranged in superposition and with a spacing therebetween so as to form a space for the passage of the blades 36 and 37 of the rotor between them.

The stationary section of the magnetic circuit carries furthermore a tongue 39 which is angularly slightly shifted with reference to the diameter passing through the terminal surfaces 34 and 35.

When the rotor passes through its position of static equilibrium in one direction of rotation, the flux closes over the blade 37 whereas for the other direction, it is diverted partly through the entire rotor 38 which cuts out the driving action of one pulse out of two.

FIGS. 30, 31 and 32 illustrate a method for producing a rotor according to FIG. 28. Said method consists in starting from a shaped cut plate (FIG. 30) of which the ends 40 and 41 are folded in opposite directions so as to form the blades 36 and 37.

FIGS. 33, 34 and 35 show how it is possible to improve the magnetic coupling between the oscillating section 42 and the stationary section 43 of the magnetic circuit.

The amplifying circuit illustrated in FIGS. 37 to 40 are applicable to the different structures described with reference to FIGS. 19 to 35. Said amplifier circuits may be modified as concerns the relative position of the windings with reference to the transistor electrodes. Thus, in all the examples illustrated, the driving winding may be inserted either in the collector circuit or in the emitter circuit of the transistor while the collecting winding which is generally located in the base circuit may be inserted in the emitter circuit when the driving winding is inserted in the collector circuit.

Lastly, when the driving winding is inserted in the emitter circuit, the collecting winding which is generally inserted between the emitter and the base may as well be inserted between the base and ground which implies a higher input voltage.

FIG. 36 shows the modifications of the voltages Vc and Vm across the terminals of the windings Bc and Bm in circuits including means for delaying the restoration of the magnetizing current.

A suitable selection of the value of the elements defining the duration of locking of the transistor, allows transmitting to the balance a maintenance pulse only once out of two alternations, i.e. the operative pulses are all directed in the same direction.

As to the circuit illustrated in FIG. 37, which is a modification of FIG. 10, the winding Bm is subdivided into two sections B'm and B''m, the demagnetizing current passing through the section B'm of said winding.

The circuit of FIG. 38 includes a transistor T1 adapted to limit the magnetizing current. As soon as a current provides for the release of the transistor T1, the transistor T has a tendency to be locked. The magnetizing current is adjusted through a suitable selection of the value of the resistance R. The locking of the transistor T is defined by the time constant R1, C1.

The circuit of FIG. 39 is a further modification of that of FIG. 13.

The circuit according to FIG. 40 is a modification of that illustrated in FIG. 37 and includes a silicon type diode D which becomes conductive only for a D.C. voltage of about 0.3 volt and which provides a better compensation of the thermic shifting.

Obviously, the invention is not limited to the embodiments described and, in particular, the improved arrangement may be applied to the control of a continuously rotating power unit.

What I claim is:

1. In a control system for a balance wheel, the combination of a member made of magnetic material showing substantially no remanence and rigid with said balance wheel, a driving winding cooperating with said magnetic member, a circuit feeding said driving winding with periodical driving pulses to maintain the oscillations of the balance wheel, and a condenser electrically connected with said circuit and adapted to be charged each time a driving pulse passes through the circuit to be discharged after each pulse into the driving winding in a direction opposed to the direction of passage of said pulse through said driving winding to cut out any residual magnetization in the magnetic member.

2. In a control system for a balance wheel, the combination of a member made of magnetic material showing substantially no remanence and rigid with said balance wheel, a driving winding cooperating with said magnetic member, a circuit feeding said driving winding with periodical driving pulses to maintain the oscillations of the balance wheel, a condenser, means whereby the end of each driving pulse produces an induction current charging the condenser, and means connecting the condenser with said circuit whereby the condenser is discharged after each pulse into the driving winding in a direction opposed to the direction of passage of said pulse through said driving winding to cut out any residual magnetization in the magnetic member.

3. In a control system for a balance wheel, the combination of a member made of magnetic material showing substantially no remanence and rigid with said balance wheel, a driving winding cooperating with said magnetic member, a circuit feeding said driving winding with periodical driving pulses to maintain the oscillations of the balance wheel, and a condenser electrically connected with said circuit and adapted to be charged by each pulse and to be discharged after each pulse into the driving winding in a direction opposed to the direction of passage of said pulse through said driving winding to cut out any residual magnetization in the magnetic member.

4. In a control system for a balance wheel, the combination of a member made of magnetic material showing substantially no remanence and rigid with said balance wheel, a driving winding cooperating with said magnetic member, a transistor feeding said driving winding, a generating winding connected with the transistor base, means locking the transistor periodically against operation to produce periodical driving pulses through the driving winding and thereby maintain the oscillations of the balance wheel, and a condenser electrically connected with the transistor and adapted to be charged each time a driving pulse passes through the driving winding and to be discharged after each pulse into the driving winding in a direction opposed to the direction of passage of said pulse through said driving winding to cut out any residual magnetization in the magnetic member.

5. In a control system for a balance wheel, the combination of a member made of magnetic material showing substantially no remanence and rigid with said balance wheel, a driving winding cooperating with said magnetic member, a transistor feeding said driving winding, a generating winding connected with the transistor base, a resistance and capacitor circuit locking the transistor periodically against operation to produce periodical driving pulses in the driving winding and thereby maintain the oscillations of the balance wheel, and a condenser electrically connected with the transistor and adapted to be charged each time a driving pulse passes through the driving winding and to be discharged after each pulse into the driving winding in a direction opposed to the direction of passage of said pulse through said driving winding to cut out any residual magnetization in the magnetic member.

6. In a control system as claimed in claim 4, the provision of means adapted to compensate the thermic drifting of the transistor.

7. In a control system as claimed in claim 4, the provision of a resistance in series with the transistor emitter and an uncoupling capacitor in parallel with said resistance and adapted to compensate the thermic drifting of the transistor.

8. In a control system as claimed in claim 4, the provision of a resistance in series with the transistor emitter and an uncoupling diode parallel with said resistance and adapted to compensate the thermic drifting of the transistor.

9. In a control system as claimed in claim 4, the provision of means adapted to choke the parasitic oscillations produced by the coupling of the driving and generating windings.

10. In a control system as claimed in claim 4, the provision of means adapted to choke the parasitic oscillations produced by the coupling of the driving and generating windings and including a diode inserted in series with the generating winding.

11. In a control system for a balance wheel, the combination of a member made of magnetic material showing substantially no remanence and rigid with said balance wheel, a driving winding cooperating with said magnetic member, means for feeding a current of a low intensity through the driving winding to magnetize the magnetic member, a circuit feeding said driving winding with periodical driving pulses to maintain the oscillations of the balance wheel, and a condenser electrically connected with said circuit and adapted to be charged each time a driving pulse passes through the circuit to be discharged after each pulse into the driving winding in a direction opposed to the direction of passage of said pulse through said driving winding to cut out any residual magnetization in the magnetic member.

12. In a control system for a balance wheel, the combination of a member made of magnetic material showing substantially no remanence and rigid with said balance wheel, a driving winding cooperating with said magnetic member, a D.C. supply for feeding a current of a low intensity through the driving winding to magnetize the magnetic member, a circuit feeding said driving winding with periodical driving pulses to maintain the oscillations of the balance wheel, and a condenser electrically connected with said circuit and adapted to be charged each time a driving pulse passes through the circuit to be discharged after each pulse into the driving winding in a direction opposed to the direction of passage of said pulse through said driving winding to cut out any residual magnetization in the magnetic member.

References Cited in the file of this patent

UNITED STATES PATENTS

| | | |
|---|---|---|
| 2,831,114 | Van Overbeek | Apr. 15, 1958 |
| 2,895,095 | Guyton | July 14, 1959 |
| 2,962,643 | Kwartiroff | Nov. 29, 1960 |

FOREIGN PATENTS

| | | |
|---|---|---|
| 68,406 | France | Nov. 12, 1957 |
| | (Addition to No. 1,090,564) | |